United States Patent [19]

Kuwahara et al.

[11] Patent Number: 4,496,592
[45] Date of Patent: Jan. 29, 1985

[54] PROCESS FOR PRODUCING CHEWING GUM IN THE FORM OF COMPOSITE FIBERS

[75] Inventors: Rikiya Kuwahara; Akinaka Habuto, both of Kanagawa; Hisayoshi Oiso, Tokyo, all of Japan

[73] Assignee: Meiji Seika Kaisha, Ltd., Tokyo, Japan

[21] Appl. No.: 495,876

[22] Filed: May 18, 1983

[30] Foreign Application Priority Data

Oct. 5, 1982 [JP] Japan ................................ 57-173924

[51] Int. Cl.³ ............................................. A23G 3/30
[52] U.S. Cl. ........................................ 426/5; 426/660
[58] Field of Search .......................................... 426/3–6, 426/660

[56] References Cited

U.S. PATENT DOCUMENTS

| 2,973,273 | 2/1961 | Curtiss | 426/5 |
| 3,020,164 | 2/1962 | Forkner | 426/3 |
| 3,557,717 | 1/1971 | Chivers | 426/660 |
| 3,635,735 | 1/1972 | Patil | 426/3 |
| 3,723,134 | 3/1973 | Chivers | 426/660 |
| 3,930,043 | 12/1975 | Warning | 426/660 |
| 3,958,018 | 5/1976 | Tay | 426/660 |
| 4,000,321 | 12/1976 | Mochizuki et al. | 426/3 |
| 4,117,176 | 9/1978 | Taylor | 426/660 |
| 4,133,905 | 1/1979 | Cannone | 426/660 |

Primary Examiner—Jeanette Hunter
Attorney, Agent, or Firm—Sughrue, Mion, Zinn, Macpeak, and Seas

[57] ABSTRACT

Chewing gum in the form of composite fibers is produced by fiberizing a sugar and/or a candy and a chewing gum base or composition through a fiberizing section, such as a rotating cylinder, of a candy floss making machine.

15 Claims, 2 Drawing Figures

PROCESS FOR PRODUCING CHEWING GUM IN THE FORM OF COMPOSITE FIBERS

BACKGROUND AND SUMMARY OF THE INVENTION

This invention relates to a process for producing chewing gum in the form of composite fibers. Specifically, it relates to a process for producing chewing gum in the form of composite fibers, which comprises feeding a sugar and/or a candy and a chewing gum base or chewing gum composition sugar mixture into a fiberizing section, such as a rotating cylinder, of a candy floss (cotton candy) making machine thereby to fiberizing them into composite fibers.

More specifically, the present invention pertains to a process for producing chewing gum in the form of composite fibers, which comprises feeding a sugar such as sucrose, maltose, lactose or corn syrup and as an optional component glucose or a sugar alcohol such as sorbitol, or a material obtained by adding water to said sugar or sugar alcohol and melting the mixture, and/or a candy obtained by mixing such sugars and boiling them after adding water if desired, or a product obtained by cooling and pulverizing such a candy, into a fiberizing section, such as a rotating cylinder, of an ordinary candy floss making machine and fiberizing them; wherein a chewing gum base or chewing gum composition prepared in a customary manner is fed into said fiberizing section either simultaneously or alternately with said sugar, sugar mixture and/or candy whereby, for example, (1) the chewing gum base or chewing gum composition is entangled with fibers of said sugar or sugar mixture in the broad sense, or (2) the chewing gum base or chewing gum composition is converted to fine particles which are sprinkled and sticked to the fibers of the sugar or sugar mixture and/or candy, thus forming composite fibers.

The chewing gum in the form of composite fibers obtained by the process of this invention resembles conventional candy floss, and is new in that its outer shape quite differs from conventional stick gums, bubble gums, sugar-coated gums, etc. It has a high merchandize value because it has the soft and well-melting mouthfeel of candy floss and the good chewing characteristics of chewing gum.

DETAILED DESCRIPTION OF THE INVENTION

Figure 1:
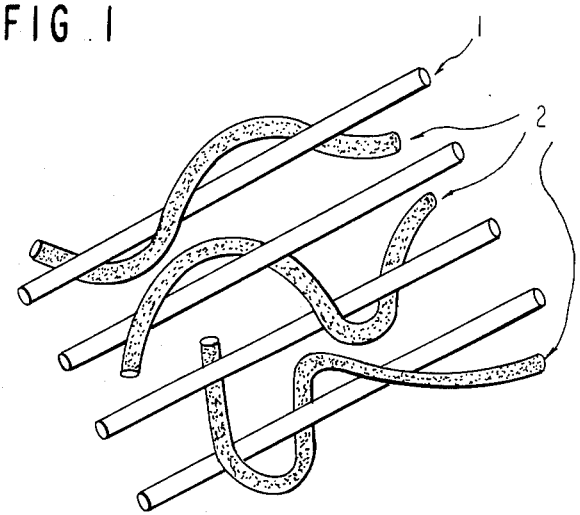
FIG. 1 is a side explanatory view of the chewing gum in the form of entangled composite fibers embodying this invention.

The granular or molten chewing gum base or the granular or molten gum base portion of the chewing gum composition used in this invention is obtained by blending a natural or synthetic gum base such as a stick gum base or bubble gum base prepared by a conventional method with other required ingredients. There is no restriction in blending the raw materials, and chewing gum bases having a broad range of chewing characteristics can be used. A sugar to be incorporated in the chewing gum composition is not particularly restricted, and there can be used a wide range of sugars such as sucrose, maltose, lactose, corn syrup and optionally, glucose or sugar alcohols such as sorbitol. Flavoring agents, such as orange, strawberry and lemon flavor, can be used.

The sugar used in this invention and/or the sugar used in the candy may be any combination of sugars which, optionally after adding water, can be boiled to a candy. For example, a combination of sugars containing at least one of sucrose, maltose, lactose and corn syrup as a main component, or a combination of such sugars with glucose or a sugar alcohol such as sorbitol optionally added. As a flavoring agent, a flavor selected, for example, from orange, strawberry, lemon and peppermint can be used. Furthermore, as required, an acidulating agent such as citric acid, malic acid may be used. If a mixture of a sugar and/or a candy with the acidulating agent is fiberized, the resulting fibrous material of the sugar and/or the candy absorbs moisture and becomes sticky so that its shape retention during storage is lost. For this reason, the acidulating agent should be mixed with the chewing gum base or the chewing gum composition, or the acidulating agent may be powderized and sprinkled onto the composite fibers. Alternatively, these two methods may be used in combination.

Table 1 below summarizes the results of a test for the fiberized state of (1) a sugar, sugar mixture or (2) a pulverized product obtained by mixing at least two sugars, optionally adding water, boiling the mixture to a candy, cooling it and pulverizing it, when it is fiberized in the rotating cylinder of an ordinary candy floss making machine.

TABLE 1-(1)

| | (1) Sugar or Sugar Mixture | | | | | | |
|---|---|---|---|---|---|---|---|
| Sugar or its blend No. | Sucrose (%) | Maltose (%) | Glucose (%) | Lactose (%) | Sorbitol (%) | Corn syrup (%) | State of fiberization |
| 1 | 100 | — | — | — | — | — | O |
| 2 | — | 100 | — | — | — | — | O |
| 3 | — | — | 100 | — | — | — | X |
| 4 | — | — | — | 100 | — | — | O |
| 5 | — | — | — | — | 100 | — | X |
| 6 | — | — | — | — | — | 100 | O |
| 7 | 50 | 50 | — | — | — | — | O |
| 8 | 70 | — | 30 | — | — | — | O |
| 9 | 70 | — | — | 30 | — | — | O |
| 10 | 70 | — | — | — | 30 | — | X |
| 11 | 70 | — | — | — | — | 30 | O |
| 12 | 40 | 30 | — | — | — | 30 | O |
| 13 | 60 | — | — | — | 20 | 20 | O |

TABLE 1-(1)-continued

| 14 | 50 | — | 10 | 20 | — | 20 | O |

(2) Candy

| Candy blend No. | Sucrose (%) | Maltose (%) | Glucose (%) | Lactose (%) | Sorbitol (%) | Corn syrup (%) | State of Fiberization |
|---|---|---|---|---|---|---|---|
| 1 | 50 | 50 | — | — | — | — | O |
| 2 | 70 | — | 30 | — | — | — | O |
| 3 | 70 | — | — | 30 | — | — | O |
| 4 | 70 | — | — | — | 30 | — | X |
| 5 | 50 | — | — | — | — | 50 | O |
| 6 | 30 | 30 | — | — | — | 40 | O |
| 7 | 60 | — | — | — | 20 | 20 | Δ |
| 8 | 20 | — | 10 | 30 | — | 40 | O |

Note: The state of fiberization was evaluated as follows:
O: : fiberization is possible
Δ: fiberization is somewhat difficult
X: fiberization is difficult As shown in Table 1-(1), when used singly, sucrose, maltose, lactose and corn syrup (water content not more than 4%) excepting glucose and sorbitol can be fiberized. Further mixture of these sugars also can be fiberized excepting blend No. 10 which is difficult to fiberize. As regards candies obtained by mixing at least two sugars and boiling them after optionally adding water, it is seen from Table 1-(2) that candies obtained by mixing at least two of sucrose, maltose, lactose and corn syrup (water content not more than 4%) which can singly be fiberized and boiling down the mixture after optionally adding water can be fiberized. But the blend No. 4 consisting of 70 parts by weight of sucrose and 30 parts by weight of sorbitol, and the blend No. 7 consisting of 60 parts by weight of sucrose, 20 parts by weight of sorbitol and 20 parts by weight of corn syrup, which are difficult to convert into candies by boiling, are difficult or somewhat difficult to fiberize.

Figure 2:
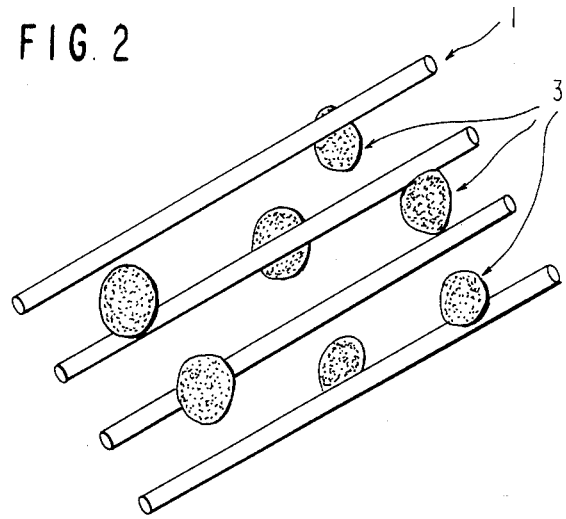
FIG. 2 is a side explanatory view of the chewing gum in the form of candy fibers to which granules of chewing gum sticked embodying this invention.

Fiberization of the sugar, sugar mixture and/or the candy becomes possible for the first time by heating the sugar, sugar mixture and/or the candy to a temperature above its melting temperature. As will be stated hereinbelow and illustrated in FIG. 2, when the melting temperature of the chewing gum base is considerably different from the melting temperature of the sugar, sugar mixture and/or the candy, the chewing gum base or the chewing gum composition in the form of granules 3 adheres to fibers of the sugars as illustrated in FIG. 2. When the melting temperature of the chewing gum base is close to that of the sugar, sugar mixture and/or candy, the chewing gum base or the chewing gum composition in the form of 2 in FIG. 1 gets entangled with the sugar upon fiberization of the sugar, sugar mixture and/or candy and is fiberized as illustrated in FIG. 1. The collected mass of the fibers is an entanglement of the two and has good shape retention. It can, therefore, be easily subjected to subsequent molding such as pressing.

In the present invention, the granular or molten sugar, sugar mixture and/or candy and the granular or molten chewing gum base or chewing gum composition are fiberized by feeding them separately and simultaneously, or alternately, into the fiberizing section (such as a rotating cylinder) of a candy floss making machine. They can also be fiberized by feeding a mixture in a suitable ratio of the granular sugar, sugar mixture and/or candy and the granular or molten chewing gum base or chewing gum composition, a molten mixture obtained by heat-melting the aforesaid mixture, or a pulverized product obtained by cooling such a mixture and then pulverizing it.

Table 2 below summarizes the results of organoleptic tests on the qualities (mouthfeel and shape retention during storage) of chewing gums and on the state of fiberization when the rotating cylinder heated at each of the indicated temperatures of a candy floss making machine was charged with a chewing gum base, a chewing gum composition or a sugar-coated gum singly, or with sucrose alone or a candy and a chewing gum base or chewing gum composition together, or with a pulverized product obtained by cooling a molten mixture of a molten candy or sucrose and a chewing gum composition or chewing gum base.

TABLE 2

| Test No. | Gum | Sugar | Temperature of the rotating cylinder (°C.) | State of fiberization | Evaluation of quality | | Remarks |
|---|---|---|---|---|---|---|---|
| | | | | | Mouth-feel | Shape retention | |
| 1 | Chewing gum base | | | | | | |
| | Stick gum base | — | 120 | Fiberization possible | X | X | The fibers adhere to each other. No shape retention |
| | Bubble gum base | — | 120 | Fiberization possible | X | X | |
| 2 | Chewing gum composition | | | | | | |
| | Stick gum base | — | 200 | Short fibers formed | Δ | Δ | Heavy mouthfeel; shape retention not satisfactory |
| | Bubble gum base | — | 200 | Not fiberized; scattered in particles | X | X | |
| 3 | Sugar-coated | — | 200 | Fiberization | X | X | The fibers adhere |

TABLE 2-continued

| Test No. | Gum | Sugar | Temperature of the rotating cylinder (°C.) | State of fiberization | Evaluation of quality Mouth-feel | Evaluation of quality Shape retention | Remarks |
|---|---|---|---|---|---|---|---|
| | gum in small particles | | | possible | | | to each other; no shape retention |
| 4 | Granular chewing gum composition (bubble gum base) 1 part by weight | Sucrose 1 part by weight | 200 | The particles of the chewing gum adhered to long fibers of sucrose | O | O | |
| 5 | Molten chewing gum base (bubble gum base) 1 part by weight | Sucrose 3 parts by weight | 200 | The particles of the chewing gum adhered to long fibers of sucrose | O | O | |
| 6 | Molten chewing gum base (bubble gum base) 1 part by weight | Molten candy 3 parts by weight | 150 | The long fibers of the two are entangled | O | O | |
| 7 | Product obtained by melt-mixing 3 parts by weight of molten candy with 1 part by weight of a bubble gum base, cooling the mixture and pulverizing it. | | 150 | The short fibers of the two are entangled | O | O | Slightly dry and crumbling to the mouthfeel |
| 8 | Product obtained by melt-mixing 1 part by weight of molten candy with 1 part by weight of a stick gum composition, cooling the mixture and pulverizing it. | | 150 | The short fibers of the two are entangled | O | O | Slightly dry and crumbling to the mouthfeel |
| 9 | Product obtained by melt-mixing 3 parts by weight of sucrosed melted by adding water with 1 part by weight of a bubble gum base, cooling the mixture and pulverizing it. | | 200 | Short fibers | O | O | Slightly heavy to the mouthfeel |
| 10 | Product obtained by melt-mixing 1 part by weight of sucrose melted by adding water with 1 part by weight of a stick gum composition, cooling the mixture and pulverizing it. | | 200 | Short fibers | O | O | Slightly heavy to the mouthfeel |

The mouthfeel and the shape retention during storage were evaluated by an organoleptic test by a panel of 30 specialists. The results are evaluated on the following scale of three grades.

| X | poor |
|---|---|
| Δ | somewhat poor |
| O | good |

In test No. 1, both the stick gum base and the bubble gum base can singly be fiberized, but the fibers stick to each other, and the products had a very poor mouthfeel and very poor shape retention during storage. In test No. 2 using a chewing gum composition alone, the composition containing a stick gum base can be fiberized into short fibers. But the product is not satisfactory in shape retention due to humidification during storage and had a heavy mouthfeel. Hence, it was evaluated as being slightly inferior in quality. The chewing gum composition containing the bubble gum base only scatters in particles from the rotating cylinder of the candy floss making machine and is not fiberized. The difference in the state of fiberization between the two is ascribed to the presence or absence of natural resins such as chicle and jelutong. In test No. 3 using the sugar-coated gum in small particles, fiberization is possible. But because the fibers adhere to each other, the product has no shape retention during storage and its mouthfeel is not good. In tests Nos. 4 and 5, a combination of sucrose as a sugar with the particular chewing gum composition (using a bubble gum base) and a combination of sucrose with the molten chewing gum base (using a bubble gum base) were examined while expecting the good shape retention of sucrose fibers. However, since the melting point of sucrose differs from that of the chewing gum base by 80° to 100° C., the chewing gum base having a much lower melting point cannot be fiberized, and the granular chewing gum composition or the molten chewing gum base scatters in particles and adheres to the sucrose fibers. However, the resulting composite fibers have excellent shape retention during storage and gives rise to no problem in regard to mouthfeel. Thus, they are evaluated as good in quality. In test No. 6, molten candy is used instead of sucrose as a sugar, and a mixture of it with the molten chewing gum base (using a bubble gum base) is fiberized at 150°

C. The two are fiberized without scattering in particles to produce composite fibers in which the long fibers of the two are entangled with each other. As shown in tests Nos. 7 and 8, a product obtained by melt-mixing molten candy with a chewing gum base or chewing gum composition, cooling the mixture and pulverizing it gives short fibers. The product has good shape retention during storage. Although it gives a somewhat dry and crumbling mouthfeel, it is not a serious problem in quality and the product is evaluated as good in quality. Furthermore, as shown in tests Nos. 9 and 10, a product obtained by melt-mixing sugar heat-melted after adding water with a chewing gum base or chewing gum composition, cooling the mixture and pulverizing it gives short fibers which are somewhat heavy to the mouthfeel. But the shape retention during storage and the mouthfeel of this product do not give rise to a serious problem in quality and its quality is regarded as being good.

In tests Nos. 4, 5 and 6, combinations of granular or molten sugar or candy with a granular or molten chewing gum base or composition have been investigated. Irrespective of whether the sugar, sugar mixture or candy and the chewing gum base or chewing gum composition to be fed are granular or molten, there is no appreciable difference in quality in the composite fibrous products formed from the rotating cylinders maintained at the same temperature. The only difference is the amount of heat required to maintain the rotating cylinders of candy floss making machine at the same temperature depending upon whether the starting materials are granular or molten.

As shown in Example 3 given hereinbelow, when the sugar or candy and the chewing gum base or chewing gum composition are made granular and/or molten and fed alternately, the state of the resulting composite fibers is the same as in the case of feeding them separately and simultaneously because certain amounts of them stay in the hopper. Furthermore, as shown in Example 4 given hereinbelow, when a granular sugar or candy is mixed with a granular chewing gum base or chewing gum composition, long fibers are produced as in the case of feeding them separately and simultaneously. When both of them are molten, short fibers are formed as started above. These facts are omitted in the above tests.

(1) Sucrose as a sugar and a chewing gum base in the weights indicated in Table 3 or (2) a candy obtained by adding water to a sugar mixture and boiling it and a chewing gum base in the weights indicated in Table 3 were each fed into the rotating cylinder of a candy floss making machine. The collectability of the resulting composite fibers of the sugar or candy and the chewing gum base was tested. At the same time, the mouthfeel and shape retention of these fibers were also evaluated by an organoleptic test. The results are summarized in Table 3.

TABLE 3

| (1) Sucrose-Chewing Gum Base | | | | |
|---|---|---|---|---|
| Chewing gum base parts by weight | Sucrose parts by weight | Mouthfeel | Shape retention during storage | Workability in fiber collection and molding by pressing |
| 5 | 1 | X | X | X |
| 3 | 1 | X | X | X |
| 2 | 1 | X | X | X |
| 1.5 | 1 | Δ | Δ | Δ |
| 1.2 | 1 | Δ | Δ | Δ |
| 1 | 1 | Δ | Δ | Δ |
| 0.5 | 1 | O | O | O |
| 0.33 | 1 | O | O | O |
| 0.2 | 1 | O | O | O |
| 0.1 | 1 | X | O | O |
| 0.077 | 1 | X | O | O |
| (2) Candy-Chewing Gum Base | | | | |
| Chewing gum base parts by weight | Candy parts by weight | Mouthfeel | Shape retention during storage | Workability in fiber collection and molding by pressing |
| 5 | 1 | X | X | X |
| 3 | 1 | X | X | Δ |
| 2 | 1 | X | X | Δ |
| 1.5 | 1 | Δ | Δ | O |
| 1.2 | 1 | Δ | Δ | O |
| 1 | 1 | Δ | Δ | O |
| 0.5 | 1 | O | O | O |
| 0.33 | 1 | O | O | O |
| 0.2 | 1 | O | O | O |
| 0.1 | 1 | X | O | O |
| 0.077 | 1 | X | O | O |

Note 1
The mouthfeel and the shape retention during storage were organoleptically evaluated by a panel of 30 specialists. The results were rated on the following scale of three grades.
X poor
Δ somewhat poor
O good
Note 2
Workability in fiber collection and molding by pressing was evaluated on the following scale of three grades.
X poor
Δ somewhat poor
O good When the amount of the chewing gum base exceeds 1.5 parts by weight as against 1 part by weight of the sucrose or candy, the resulting fibers stick to the wall of the fiber collecting section of the candy floss making machine, and workability in fiber collection and molding by pressing becomes poor in the case of sucrose. In the case of the candy, the workability is poor and the mouthfeel and shape retention during storage also become poor.

When the amount of the chewing gum base in less than 0.2 part by weight as against 1 part by weight of the sucrose or candy, there is no tendency of the fiberized product sticking to the wall, and the fiber-collecting workability is very good. However, the product loses chewing characteristics required of chewing gums, and its mouthfeel becomes the same as candy floss. Thus, it undesirably lacks a merchantable value as a chewing gum.

There is no particular restriction on the candy floss making machine used for fiberization. There can, for example, be used an ordinary candy floss making machine in which a rotating cylinder is used as a fiber-forming section, and a fiberizing machine adapted to allow a molten liquid received in a receptacle to descend by gravity in the form of continuous filaments from a number of apertures formed at the bottom of the receptacle while blowing hot air sideways against the continuous filament, and a machine adapted to spray two fluids simultaneously. The former is usually employed in glass fiber production.

According to the second-mentioned fiberizing machine, a molten sugar or candy and a molten chewing gum base or composition are stored in separate receptacles or a molten mixture of these is stored in a single receptacle, and simultaneously or alternately allowed to descend by gravity so as to form composite fibers.

The chewing gum of this invention in the form of composite fibers which is obtained as described above is quite new in its outer shape and has the very soft, well-melting mouthfeel of candy floss and the good chewing characteristics of chewing gums such as stick gums and bubble gums. It greatly stimulates the consumer's interest.

Further the chewing gum in the form of composite fibers of the present invention can be mixed or sprayed with various edible materials described hereinunder and can enhance its merchandable value.

Tea leaf such as black tea, green tea and so on and dried fruit such as grape, peaches and so on is usually difficult to be mixed with the ordinary chewing gum composition and be formed into stick chewing gum. However, they can easily be granulated or powdered and mixed with or sprayed onto the composite fibrous chewing gum of the present invention and the resulting products can be more flavorous and tasty.

Likewise dried crude drug such as Ginseng (root of Panax Ginseng C. A. Meyer), cinnamon, licorice and so on and herb such as majoram, oregano, parsley, thyme and so on can also be granulated or powdered and mixed with or sprayed onto the composite fibrous chewing gum of the present invention and the resulting products can be more healthily imaged.

Further oil seed such as sesame seed and pine seed and so on, which usually cannot be mixed with the chewing gum composition because their oil component remarkably reduces the chewing characteristics of the chewing gum, can also be easily mixed with or sprayed onto the composite fibrous chewing gum of the present invention.

The following Examples illustrate the present invention in greater detail.

EXAMPLE 1

| Ingredients (I): | | |
|---|---|---|
| Stick gum base | 90% by weight | 27 parts by weight |
| Acidulating agent | 10% by weight | |
| Ingredients (II): | | |
| Candy | | |
| Sucrose | 44% by weight | |
| Maltose | 20% by weight | |
| Lactose | 10% by weight | 73 parts by weight |
| Corn syrup | 25% by weight | |
| Flavor | 1% by weight | |
| Water | 30% by weight | |

The sucrose, maltose, lactose, corn syrup and water in the ingredients (II) were melted at 150° C., and the flavor was added while the molten materials were cooled on a cooling slab. The mixture was cooled and solidified, and pulverized by an ordinary pulverizer.

Then, the stick gum base and the acidulating agent in the ingredients (I) were mixed by a mixer, and the mixture was cut and molded to a size of about ASTN 4 mesh sieve through by an ordinary cutter. Then, 27 parts by weight of the stick gum base particles containing the acidulating agent and 73 parts by weight of the candy particles were simultaneously fed into a rotating cylinder in a candy floss making machine which was heated at 150° C. and was rotating at 3,000 rmp. The resulting composite fibrous materials were collected, and cut to a suitable size to give a chewing gum product in the form of composite fibers which had a good mouthfeel and in which long fibers of the candy were entangled with long fibers of the stick gum base as illustrated in FIG. 1.

EXAMPLE 2

| Ingredient (I): | | |
|---|---|---|
| Stick gum base | | 22 parts by weight |
| Ingredients (II): | | |
| Candy | | |
| Sucrose | 44% by weight | |
| Maltose | 20% by weight | |
| Lactose | 10% by weight | 73 parts by weight |
| Corn syrup | 25% by weight | |
| Flavor | 1% by weight | |
| Water | 30% by weight | |
| Ingredient (III): | | |
| Acidulating agent | | 5 parts by weight |

The sucrose, maltose, lactose, corn syrup and water in the ingredients (II) were mixed, and boiled to 150° C. to form a candy melt. It was mixed with 22 parts by weight of the chewing gum base cut and molded to a size of about ASTN 4 mesh sieve through by an ordinary cutter. The mixture was molten, cooled, then pulverized by a pulverizer, and fed into a rotating cylinder of a candy floss making machine which was heated to 150° C. and was rotating at 3,000 rpm. The resulting composite fibrous material was collected while 5 parts by weight of the acidulating agent was sprayed onto the fibrous material. The collected material was cut to a suitable length to give a chewing gum product in the form of composite fibers which had a good mouthfeel and in which short fibers of the candy were entangled with fibers of the stick gum base.

EXAMPLE 3

| Ingredients (I): | | |
|---|---|---|
| Stick gum base | 96% by weight | 22 parts by weight |
| Flavor | 4% by weight | |
| Ingredient (II): | | |
| Sucrose | | 73 parts by weight |
| Ingredient (III): | | |
| Acidulating | | 5 parts by weight |

The stick gum base and the flavor in the ingredients (I) were fed into a gum kneader and mixed. The mixture was cooled, and cut and molded to a size of about ASTN 4 mesh sieve through by an ordinary cutter. Then, 73 parts by weight of sucrose as the ingredient (II) and 22 parts by weight of the granular chewing gum base were fed alternately in this sequence into a rotating cylinder of a candy floss making machine which was heated to 200° C. and was rotating at 3,000 rpm. The resulting composite fiber-like material was collected while 5 parts by weight of the acidulating agent was sprayed onto it. The material was cut to a suitable size to give a chewing gum product in the form of composite fibers which had a good mouthfeel and in which the stick gum base particles adhered to long fibers of sucrose.

EXAMPLE 4

Ingredients (I):

-continued

| Bubble gum composition | | |
|---|---|---|
| Bubble gum base | 30% by weight | |
| Powdered sugar | 48% by weight | |
| Glucose | 10% by weight | 60 parts by weight |
| Corn syrup | 10% by weight | |
| Flavor | 2% by weight | |
| Ingredients (II): | | |
| Candy | | |
| Sugar | 44% by weight | |
| Maltose | 20% by weight | |
| Lactose | 10% by weight | |
| | | 35 parts by weight |
| Corn syrup | 25% by weight | |
| Flavor | 1% by weight | |
| Water | 30% by weight | |
| Ingredient (III) | | |
| Acidulating agent | | 5 parts by weight |

The bubble gum base, powdered sugar, glucose, corn syrup and the flavor in the ingredients (I) were fed into an ordinary gum mixer, and mixed to form a bubble gum composition. It was cooled, and cut and molded to a size of about ASTN 4 mesh sieve through by an ordinary cutter. The sucrose, maltose, lactose, corn syrup and water in the ingredients (II) were mixed and then boiled to 150° C. While the molten mixture was cooled, the flavor was mixed. The mixture was then cooled and solidified, and pulverized by a ordinary pulverizing machine. Sixty parts by weight of the granular bubble gum composition was mixed with 35 parts by weight of the candy particles. The mixture was then fed into a rotating cylinder of an ordinary candy floss making machine which was heated to 150° C. at 3,000 rpm. The composite fiber-like material formed was collected while 5 parts by weight of the acidulating agent was sprayed onto, and mixed with, the material. It was cut and molded to a suitable size to give a chewing gum in the form of composite fibers which had a good mouth-feel and in which the bubble gum granules adhered to long fibers of the candy.

EXAMPLE 5

| Ingredient (I): | | |
|---|---|---|
| Bubble gum base | | 20 parts by weight |
| Ingredients (II): | | |
| Candy | | |
| Sugar | 44% by weight | |
| Maltose | 20% by weight | |
| Lactose | 10% by weight | |
| | | 60 parts by weight |
| Corn syrup | 25% by weight | |
| Flavor | 1% by weight | |
| Water | 30% by weight | |
| Ingredient (III): | | |
| Powdered green tea | | 20 parts by weight |

The operations of Example 1 were repeated using the bubble gum base as the ingredient (I) and the candy as ingredient (II). The resulting composite fiberous materials were collected while 20 parts by weight of the powdered green tea which passed through ASTN 12 mesh sieve was sprayed onto the fibrous materials and cut to a suitable size to give a chewing gum product in the form of composite fibers which can enjoy the taste and flavor of powdered green tea by gradual release when chewed.

While the invention has been described in detail and with reference to specific embodiment thereof, it will be apparent to one skilled in the art that various changes and modifications can be made therein without departing from the spirit and scope thereof.

What is claimed is:

1. A process for producing a chewing gum in the form of composite fibers, which comprises feeding (A) a sweetener selected from the group consisting of sugar, a sugar mixture, candy and mixtures thereof, wherein said candy is formed from a combination of sugars which is boiled to a candy, after optionally adding water thereto, and (B) a chewing gum base or a chewing gum composition into a fiberizing section of a candy floss making machine which is heated to a temperature sufficient to permit said materials to melt or to be maintained in a molten state, thereby to form composite fibers of said materials, wherein the proportion of the chewing gum base or the chewing gum base portion of the chewing gum composition is 0.2 to 1.5 parts by weight per part by weight of at least one of sugar and candy.

2. The process of claim 1 wherein said fiberizing section is a rotating cylinder.

3. The process of claim 1 wherein at least one of the sugar, the sugar mixture and the candy and the chewing gum base or the chewing gum composition are fed simultaneously into the fiberizing section.

4. The process of claim 1 wherein at least one of the sugar, the sugar mixture and the candy and the chewing gum base or the chewing gum composition are fed alternately into the fiberizing section.

5. The process of claim 1 wherein at least one of the sugar, the sugar mixture and the candy and the chewing gum base or the chewing gum composition are fed into the fiberizing section as a molten mixture or a cooled and pulverized product thereof.

6. The process of claim 1 wherein an acidulating agent is mixed with the chewing gum base or the chewing gum composition.

7. The process of claim 1 wherein an acidulating agent is powderized and sprinkled onto the composite fibers of said material.

8. The process of claim 1 wherein a granular or powdered edible material selected from the group consisting of leaf tea, dried fruit, herbs, Ginseng, licorice and oil seed, is mixed with or sprayed onto the formed composite fibers of said materials.

9. The process of any one of claims 1 to 8 wherein the sweetener is granular or molten.

10. The process of any one of claims 1 to 8 wherein the chewing gum base or the chewing gum composition is granular or molten.

11. The process of any one of claims 1 to 8 wherein the sweetener is selected from the group consisting of sucrose, maltose, lactose and corn syrup, with optionally glucose or sugar alcohols.

12. The process of any one of claims 1 to 8 wherein the candy is obtained by boiling a sweetener selected from the group consisting of sucrose, maltose, lactose and corn syrup, with optionally glucose or sugar alcohols, with water added as required.

13. A chewing gum characterized by good shape retention and mouth feel in the form of composite fibers formed by the process of any one of claims 1 to 8.

14. The chewing gum of claim 13 wherein fibers of said sweetener are entangled with fibers of said chewing gum base or chewing gum base composition.

15. The chewing gum of claim 13 in the form of candy fibers to which granules of chewing gum or its base are stuck.

* * * * *